April 8, 1941.  T. E. HUTCHENS  2,237,388
SAFETY MILK BOTTLE CABINET
Filed Feb. 27, 1940  2 Sheets-Sheet 1
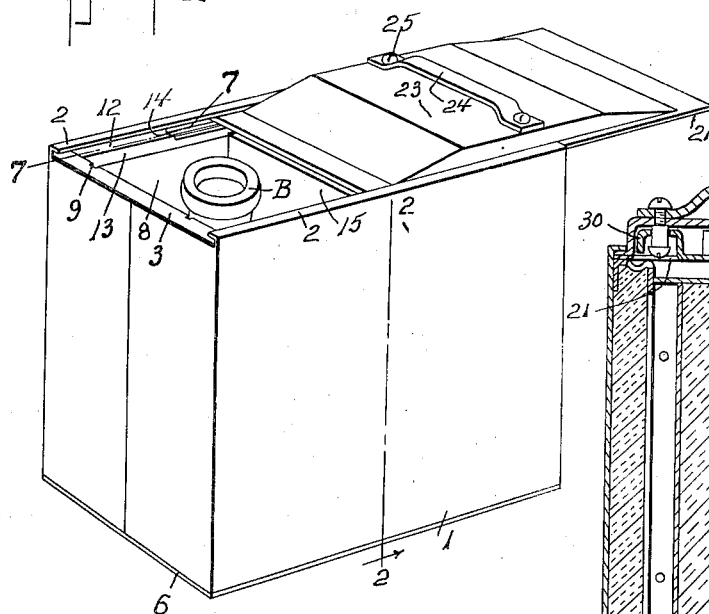
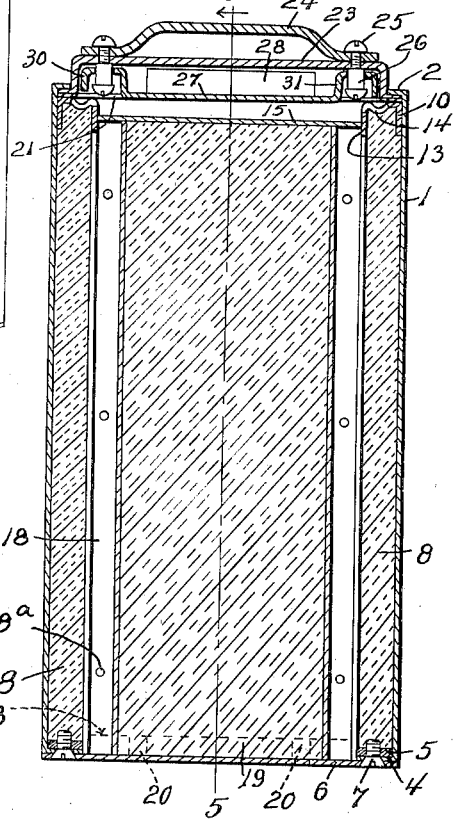
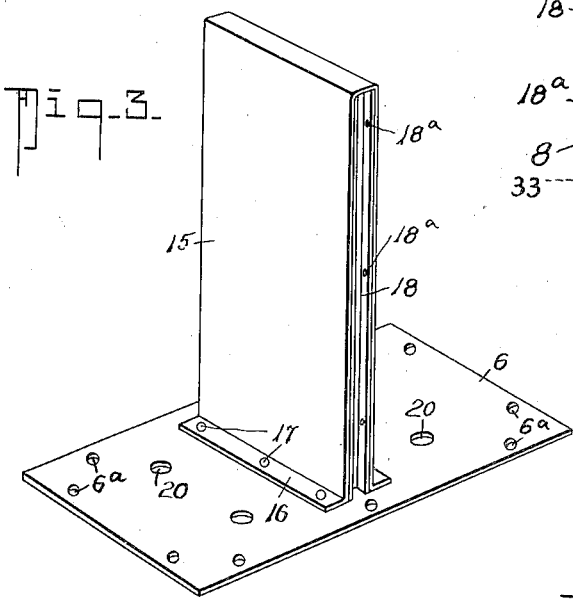
Inventor
T. E. Hutchens
By Dieterich & Rutley
Attorneys April 8, 1941.   T. E. HUTCHENS   2,237,388
SAFETY MILK BOTTLE CABINET
Filed Feb. 27, 1940   2 Sheets-Sheet 2
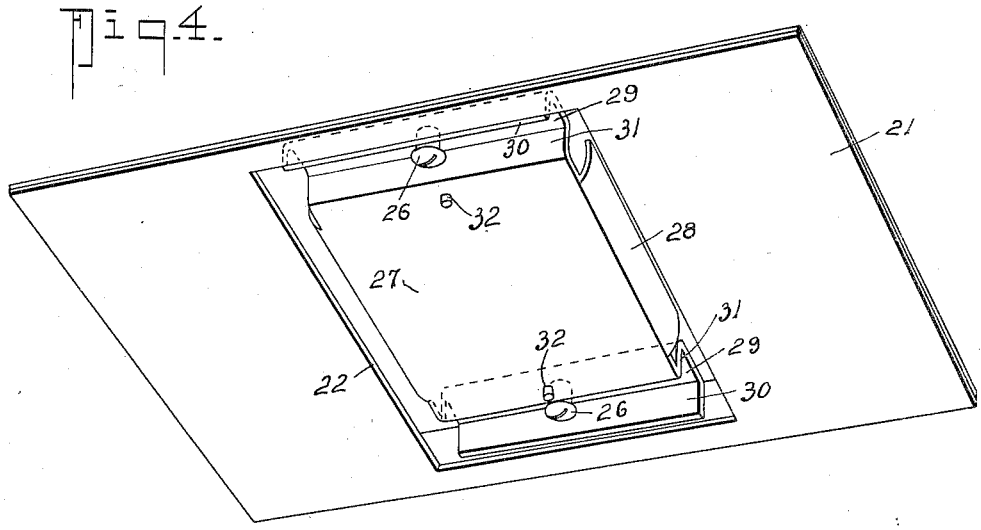
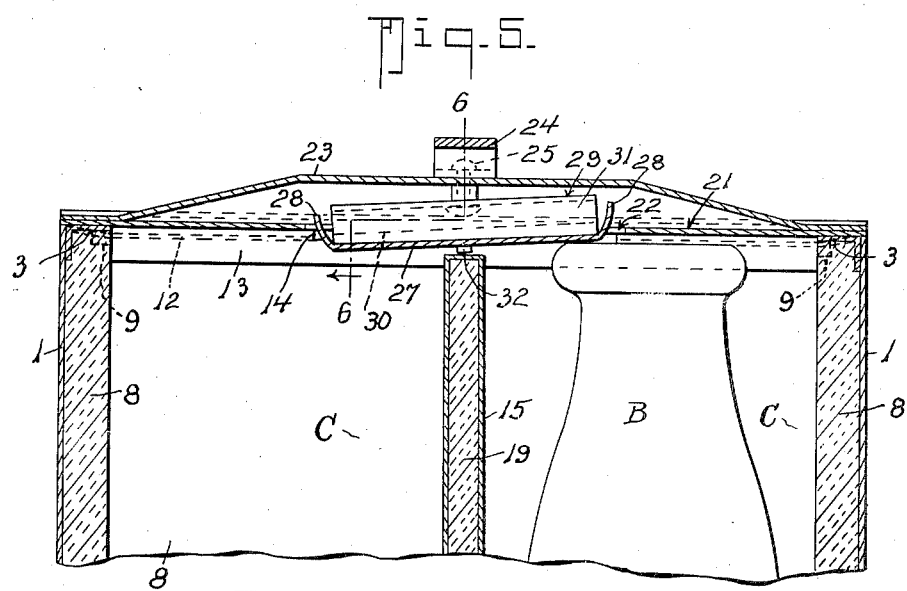
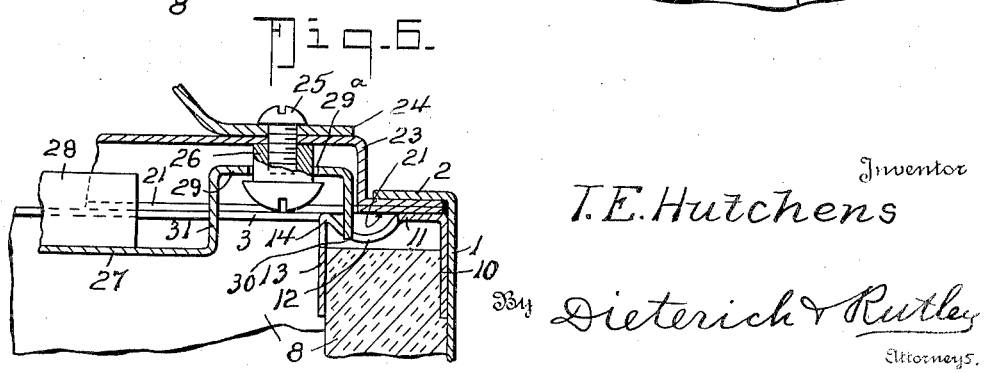
Inventor
T. E. Hutchens
By Dieterich & Rutley
Attorneys.

Patented Apr. 8, 1941

2,237,388

UNITED STATES PATENT OFFICE 2,237,388

SAFETY MILK BOTTLE CABINET

Terrell E. Hutchens, Tuttle, Okla.

Application February 27, 1940, Serial No. 321,123

8 Claims. (Cl. 232—41)

My invention relates to cabinets for the reception and exchange of milk bottles and similar articles, and it primarily has for its object to provide an improved device to insure that the housewife will return an empty milk bottle for each full bottle of milk she receives from the dairyman.

A further object is to provide such a device as will not only accomplish the above object but will also keep the milk in a more sanitary condition from the time it is left by the dairyman until it shall have been received by the housewife, the cabinet serving to protect the bottles from dogs, cats, flies and other animals and insects which might contaminate the bottles.

Another object is to provide a device which not only embodies all the aforesaid advantages but one which will also protect the milk from sunlight which causes a chemical change in the milk when left under sunlight for a period of time and causes a change in the flavor and lowers the quality of the milk.

Further, it is an object to provide an insulated cabinet for the protection of milk or other liquids from heat and cold.

Further, it is an object to provide a cabinet by means of which all the aforesaid objects are accomplished by as simple and inexpensive construction as possible.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which—

Fig. 1 is a perspective view of a cabinet with lid open and embodying my invention.

Fig. 2 is an enlarged central cross-section on the line 2—2 of Figure 1 with the lid closed and showing the position of the rocker when a bottle is present in each compartment.

Fig. 3 is a detail perspective view of the bottom plate and partition member carried thereby, drawn on the scale of Fig. 1.

Fig. 4 is a perspective view on an enlarged scale of the lid per se, looking at it from beneath.

Fig. 5 is a central vertical longitudinal section on the line 5—5 of Fig. 2, but on a larger scale and showing the position of the rocker when only one bottle is present in the cabinet.

Fig. 6 is a further enlarged detail cross section on about the line 6—6 of Fig. 5.

Fig. 7 is a detail vertical section on the line 7—7 of Fig. 1.

In the drawings in which like numerals of reference indicate like parts in all the figures, 1 is the outer shell of the box or cabinet the upper ends of the side walls of which are bent over, as at 2, and the end walls of which terminate sufficiently below the portion 2 as to form a slideway for the lid. Angle strips 3 extend across the cabinet adjacent the end walls and lie in the plane containing the upper edges of the ends of the shell 1 (see Figs. 1 and 5). These plates may be held in place in any suitable way, as by spot welding them to the case 1, for example. The strips 3 lie in a plane below that of the plate 21 so that that plate will slide over the strips as shown in Figure 5.

The bottom ends of the side and end walls of the shell 1 are also bent over inwardly as at 4 and are welded to a relatively thick ring 5 to which the removable bottom plate 6 is secured by a suitable number of countersunk screws 7. The side and end walls of the cabinet shell 1 are lined with suitable heat insulating blocks or slabs 8 as shown in Figs. 2 and 5.

The end angles 3 are notched, as at 9, for a purpose presently to appear.

Along each side of the cabinet adjacent the top is an inverted U-shaped member or strip comprising the sides 10 and 13, the channeled or grooved top portion 12 and the flat top portion 11, the mid-portion of the top for a suitable distance being cut away as at 14 (see Figs. 5 and 6).

In order to divide the cabinet into two compartments I provide a partition comprising an inverted U-shaped member 15 having flanges 17 spot welded (for example) to the bottom plate 6. The sides of the partition 15 contain U-shaped strips 18 spot welded, as at 18ª, to the member 15, the intervening space being filled with a slab 19 of suitable heat insulating material.

The bottom 6 has screw-holes 6ª for the screws 7 and also leak or vent holes 20.

The lid, in the preferred (illustrated) embodiment of my invention comprises a plate 21 to the top side of which is welded (or otherwise suitably secured) a second plate having a central raised portion 23, the plate 21 having a central rectangular opening 22 in which and in the raised portion 23 of the upper plate lies a rocking stop member. This member consists of a plate 27 having each of its sides bent into a U-shape-in-cross-section (Fig. 6) to provide an inner wall 31, a top wall 29, and an outer wall 30, the outer wall 30 of each U-shaped portion of the rocking member being (in the form illustrated) preferably slightly shorter than the wall 31. The top walls 29, at each side of the plate 27, have each a centrally located hole 29ª loosely to receive a headed stud 26 which is bored and tapped to receive a screw 25 that passes through the handle 24 and raised portion 23 of the lid (see Fig. 6). At the front and rear ends the plate 27 is extended and bent over to provide rounded shoes 28 to slip freely over the bottles B when the lid is moved from left to right and vice versa.

The rocking member is provided with two fixed stop pins 32 secured to plate 27 midway between the shoes 28 and spaced apart laterally far enough to clear the tops of the bottles and short enough to clear the partition 15 when at the lowest position of the rocking member on its hanger-lugs 26. When the lid is at the extremities of its movements, pins 32 enter notches 9 and prevent the lid from being moved far enough to uncover more than one compartment or chamber at a time.

A block 33 of insulation is placed in the bottom of each bottle compartment C (see dotted lines in Fig. 2) on which the bottles rest, the blocks 33 having vent or drain holes registering with those 20 of the base or bottom 6.

The sides 30 of the rocking member line up with the grooves 12 and ride over the same, save when the rocking member is in the position of Fig. 5 when the lower end of 30 will drop below the level of the groove, unless two bottles are present, and engage the edge of the grooved part at the cut-away place 14 and prevent the lid or cover being moved from right to left in Fig. 5.

After the lid is moved to its extreme position to the right in Fig. 5 the rocking member will have assumed a horizontal position over the bottle mouth and the left compartment C will be open to receive a bottle of milk.

On returning the lid to cover the left compartment in Fig. 5 the rocking member will ride over the second bottle and be held thereby from acting as a stop. Consequently when a bottle is in each compartment or chamber the lid may be slid toward either end to uncover either chamber one at a time as desired. When both chambers are empty the lid is locked by reason of the flanges 30 dropping down into the cut-away places 14. A bottle is placed in one chamber before the bottom 6 is secured in place. When, however, only one bottle is in the cabinet, the lid can only be slid toward the end which has the bottle and can only uncover the empty chamber.

From the foregoing description it will be seen that a very simple, neat and inexpensive cabinet has been devised which will readily and effectively serve its intended purposes.

While I have shown the cabinet designed to hold but two bottles at a time, it will be obvious that it may be enlarged to contain a greater number of bottles in multiples of two, but as that simply involves the expected skill of a mechanic and designer, illustration thereof is deemed unnecessary.

From the foregoing description, taken in connection with the accompanying drawings, it is thought that the construction and advantages of the invention will be clear to those skilled in the art to which it relates.

What I claim is:

1. An exchange cabinet for milk bottles and similar articles, comprising a box having a partition dividing it into two chambers for bottles, said box being open at the top and provided with slideways at the sides, a lid slidable endwise in said slideways for closing said chambers, and means carried by said lid and engageable with fixed stops on the box and governed by the presence of a bottle in one of said chambers for holding said lid from being slid in the direction of the other of said chambers when the other of said chambers is empty a distance sufficient to expose the bottle in said one of said chambers.

2. An exchange cabinet for milk bottles and similar articles, comprising a box having a partition dividing it into two chambers for bottles, said box being open at the top and provided with slideways at the sides, a lid slidable endwise in said slideways for closing said chambers, and means carried by said lid and engageable with fixed stops on the box and governed by the presence of a bottle in one of said chambers for holding said lid from being slid in the direction of the other of said chambers when the other of said chambers is empty a distance sufficient to expose the bottle in said one of said chambers, said first named means comprising a rocking member suspended in a chamber in said lid and movable bodily up and down and rockable on a transverse axis, guideways in said box for said rockable member, said guideways having a mid-portion of each removed to permit said rocking member to drop into the space provided by said removed portion for purposes described.

3. An exchange cabinet for milk bottles and similar articles, comprising a box having a partition dividing it into two chambers for bottles, said box being open at the top and provided with slideways at the sides, a lid slidable endwise in said slideways for closing said chambers, means carried by said lid and engageable with fixed stops on the box and governed by the presence of a bottle in one of said chambers for holding said lid from being slid in the direction of the other of said chambers when the other of said chambers is empty a distance sufficient to expose the bottle in said one of said chambers, and said means comprising a rocking member located in a chamber in said lid and movable bodily up and down and rockable on a transverse axis, guideways in said box for said rockable member, said guideways having a mid-portion of each removed to permit said rocking member to drop into the space provided by said removed portion for purposes described.

4. An exchange cabinet for milk bottles and similar articles, comprising a box having a partition dividing it into two chambers for bottles, said box being open at the top and provided with slideways at the sides, a lid slidable endwise in said slideways for closing said chambers, means carried by said lid and engageable with fixed stops on the box and governed by the presence of a bottle in one of said chambers for holding said lid from being slid in the direction of the other of said chambers when the other of said chambers is empty a distance sufficient to expose the bottle in said one of said chambers, and further means to limit the sliding movements of said lid to a distance such that only one chamber at a time can be uncovered, said first named means comprising a rocking member in a chamber in said lid and movable bodily up and down and rockable on a transverse axis, guideways in said box for said rockable member, said guideways having a mid-portion of each removed to permit said rocking member to drop into the space provided by said removed portion for purposes described, said further means comprising spaced pins secured to said rocking member and constructed so as to engage the opposite end walls of the cabinet when the lid is moved to its extremes of movement.

5. An exchange cabinet for milk bottles and similar articles, comprising an open top box having a partition dividing it into two chambers for bottles, said box being provided at the top with slideways at its sides and having cut-away portions, a lid slidable in said slideways for closing both chambers at a time, said lid having a recess, means including a rocker member lying in said recess and movable back and forth with said lid as a unit and governed by the presence of a bottle in one chamber only for cooperating with said cut-away portions to hold said lid from movement in the direction of the empty chamber to uncover the chamber containing the bottle and expose that bottle while the other chamber is empty, the pivotal axis of said rocker member lying in a direction transverse to that of the direction of sliding movement of said lid.

6. An exchange cabinet for milk bottles and similar articles, comprising an open top box having a partition dividing it into two chambers for bottles, said box being provided at the top with slideways at its sides and having cut-away portions, a lid slidable in said slideways for closing both chambers at a time, said lid having a recess, means including a rocker member lying in said recess and movable back and forth with said lid as a unit and governed by the presence of a bottle in one chamber only for cooperating with said cut-away portions to hold said lid from movement in the direction of the empty chamber to uncover the chamber containing the bottle and expose that bottle while the other chamber is empty, and means for loosely suspending said rocker member in said recess for limited rise and fall therein.

7. An exchange cabinet for milk bottles and similar articles, comprising an open top box having a partition dividing it into two chambers for bottles, a lid slidably mounted on the top of said box to close both chambers at will, said lid having a recess entering from beneath, a rocker member pivotally mounted in said recess on an axis transverse to the direction of movement of said lid, said rocker member having inclined ends to ride on and over the tops of milk bottles contained in said chambers and having side flanges, said box having side guideways having cut-away portions into which said side flanges may be projected, said cut-away portions each being of a length and depth to act as a stop to prevent the lid from being slid over an empty chamber to a sufficient extent to open a full chamber and expose the contents thereof.

8. An exchange cabinet for milk bottles and similar articles, comprising an open top box having a partition dividing it into two chambers for bottles, a lid slidably mounted on the top of said box to close both chambers at will, said lid having a recess entering from beneath, a rocker member pivotally mounted in said recess on an axis transverse to the direction of movement of said lid, said rocker member constructed to ride on and over the tops of milk bottles contained in said chambers and having side flanges, said box having side guideways having cut-away portions into which said side flanges may be projected, said cut-away portions each being of a length and depth to act as a stop to prevent the lid from being slid over an empty chamber to a sufficient extent to open a full chamber and expose the contents thereof, and stop pins located at the transverse mid-plane of the lid and projecting below the lid and movable with the lid and of a length to clear the top of said partition but not the end walls of the box, whereby said pins will prevent the withdrawal of the lid from the box and the uncovering of both chambers at the same time.

T. E. HUTCHENS.